United States Patent Office 2,837,232
Patented June 3, 1958

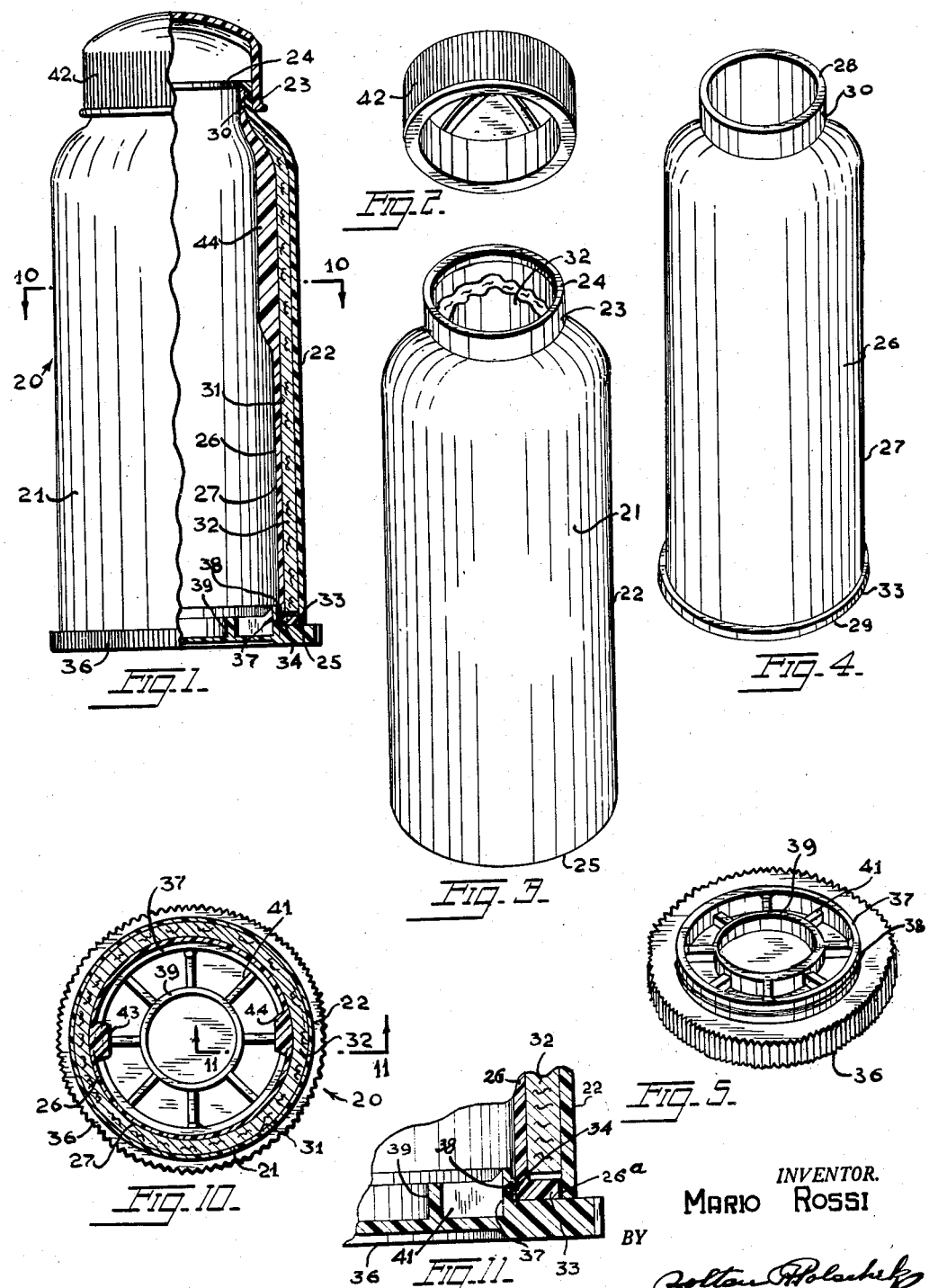

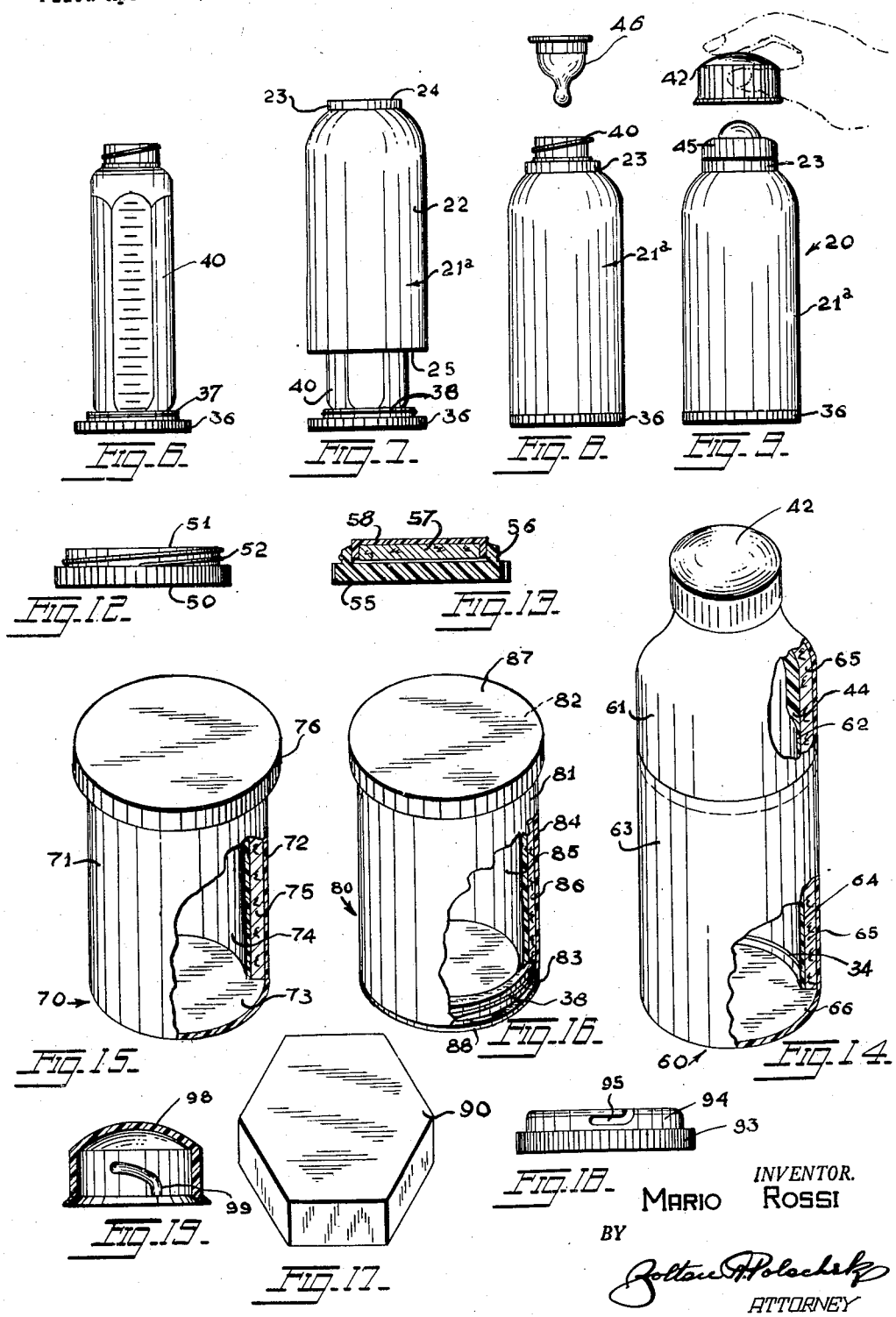

2,837,232

THERMAL CONTAINER FOR BOTTLES AND OTHER CONTAINERS

Mario Rossi, Brooklyn, N. Y., assignor to Parfour, Inc., New York, N. Y., a corporation of New York Application April 30, 1956, Serial No. 581,694

1 Claim. (Cl. 215—13)

This invention relates to new and useful improvements in thermal containers for containers of hot and cold semi-solids and fluids.

More particularly, the present invention proposes the construction of an improved thermal container for nursing bottles for babies and for other containers which will keep the contents of the bottle or container at or near a given temperature for a substantial period of time.

As a further object, the present invention proposes forming the thermal container with two hollow nested shells (cement sealed into one piece), one adapted removably to fit inside the other with an insulating space between, the inner shell being adapted to receive and hold a baby's bottle or other container firmly and without turning.

Still further, the present invention proposes constructing the thermal container with easy to clean shells and top caps and bottom closures and with Fiberglas or other insulating batting disposed in the space between the inner and outer shells.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a side elevational view of a thermal container, with parts broken away and in section, constructed and arranged in accordance with the present invention.

Fig. 2 is a perspective view of the top cap.

Fig. 3 is a perspective view of the outer hollow shell and Fiberglas insulating batting therein.

Fig. 4 is a perspective view of the inner hollow shell.

Fig. 5 is a perspective view of the bottom closure.

Fig. 6 is a view of the bottom closure and showing the first step in putting a nursing bottle in the thermal container.

Fig. 7 is a view similar to Fig. 6 but showing the next step.

Fig. 8 is a view similar to Figs. 6 and 7 but showing the next step.

Fig. 9 is a view similar to Figs. 6, 7 and 8 but showing the final step.

Fig. 10 is a sectional view taken on line 10—10 of Fig. 1.

Fig. 11 is an enlarged sectional view on the line 11—11 of Fig. 10.

Fig. 12 is a side elevational view illustrating another modified bottom closure.

Fig. 13 is a central sectional view illustrating another modified bottom closure.

Fig. 14 is a perspective view with parts being broken away of another modification.

Fig. 15 is a view similar to Fig. 14 but illustrating another modification.

Fig. 16 is a view similar to Fig. 15 but illustrating another modification.

Fig. 17 is a perspective view of another modified form of a top cap.

Fig. 18 is a side view of still another modified form of bottom end closure.

Fig. 19 is a vertical sectional view of a modified top cap.

The thermal container, in accordance with the first form of the invention illustrated in Figs. 1 to 11, inclusive, is designated generally by the reference numeral 20.

Container 20 has an outer hollow shell 21 having cylindrical wall 22 and preferably made of plastic material such as a thermoplastic. The outer shell 21 has a slightly reduced neck portion 23 and an open top 24. Outer shell 21 also has an open bottom 25.

An inner hollow shell 26, preferably made of the same material as the outer shell, has a similar shaped wall 27 and an open top 28 and open bottom 29. Inner shell 26 has a neck portion 30 and said shell is adapted to fit inside the outer shell 21 with a space 31 between the cylindrical walls 22 and 27.

A Fiberglas or other insulating material sleeve or pad 32 fits in the space 31 between the two shells 21 and 26 to insulate and cushion from shock the inner shell 26.

Inner shell 26 has a bottom flange 33 which fits against the cylindrical wall 22 of the outer shell 21 and is sealed thereto by cement 26a to close and seal the bottom of the space 31. Inner shell 26 also has an annular slightly projecting bead 34 on its inner periphery adjacent the bottom edge of the shell.

A bottom closure 36 is provided with an upstanding annular outer flange 37 having an annular bead 38 slightly projecting yieldably to permit the bead 34 on the inner shell 26 to snap thereover and interlock therewith so as to hold the bottom closure 36 over the open ends of the inner and outer shells. The bottom closure 36 also has an inner upstanding annular flange 39 of lesser height then flange 37 adapted to support the bottom of a nursing or baby bottle 40. Radial ribs 41 are also provided on the bottom closure for strengthening purposes.

Removably and frictionally fitting on the outer shell 26 over the top openings 24 and 28 of the two shells is a top cap 42, which cap is preferably knurled.

Inner shell 26 has a pair of spaced opposed projections 43 and 44 inwardly directed on the inner periphery of wall 27 to keep the bottle 40 from turning or twisting in the inner shell, although, at times, it may be more practical to use four or more of these projections 43, 44.

In order to position the bottle 40 in the container 20, the bottle 40 is first filled with the liquid or material to be kept hot or cold and placed on the bottom closure 36. The nested shells as a unit 21a are then placed over the top of the bottle and pressed onto the bottom closure. The nipple 46 is next mounted in the opening in the neck of the bottle with its sucking end down. The bottle cap 45 is then screwed onto the bottle. Top cap 42 is then pressed onto the outer shell closing the container.

The modification of the invention illustrated in Fig. 12 is characterized by the provision of a bottom closure 50 having an outer upwardly disposed flange 51 with external peripheral screw threads 52 which mate with like threads (not shown) on the inner shell of a thermal container such as container 20.

The modification of the invention illustrated in Fig. 13 is characterized by the provision of a bottom closure 55 having an upwardly disposed flange 56 forming a shallow recess above the base of the closure. The recess is packed with Fiberglas 57 retained in position by a plastic flanged cap member 58.

The modification of the invention illustrated in Fig. 14 is characterized by the provision of a sectional container 60 having an upper outer shell 61 and an upper inner shell 62 cement sealed at the bottom which press-fit into the lower set of shells 63, 64. The inner shells 62 and 64 fit in outer shells 61 and 63 with insulation 65 therebetween. The bottom 66 of the lower set of shells 63, 64 is closed.

The modification of the invention illustrated in Fig. 15 is characterized by the provision of a container 70 having an outer shell 71 with a cylindrical side wall 72 and a closed bottom end 73. An inner shell 74 fits in outer shell 71 and insulating batting 75 fits between the two shells. A top cap 76 closes the top of the container.

The modification illustrated in Fig. 16 is characterized by the provision of a container 80 having an outer shell 81 with open top and bottom ends 82 and 83 respectively and a side wall 84. An inner shell 85 fits inside the outer shell 81 and insulating material 86 fits between the two shells. These two shells are cement sealed at the bottom. A bottom closure 88 removably fits over the lower end of the container and a top cap 87 fits over the top end.

The modification of the invention illustrated in Fig. 17 is characterized by the provision of a polygonal-shaped top cap 90 for a completely polygonal-shaped container, incorporating the features of the invention.

The modification of the invention illustrated in Fig. 18 is characterized by the provision of a bottom closure 93 having an upwardly disposed flange 94 with a bayonet slot locking means 95 which mates with like closure means (not shown) on the inner shell of a thermal container such as container 20.

The modification of the invention illustrated in Fig. 19 is characterized by the provision of a top cap 98 with a spiral or bayonet-shaped groove 99 in its inner periphery to mate with the inner shell of a thermal container such as container 20.

Although the material specified for the construction of the container is plastic, it is to be understood that cork, aluminum, or other suitable material may be used.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A thermal container for nursing bottles and the like comprising an outer hollow shell having a cylindrical wall and an open top, an inner hollow shell having a cylindrical wall and an open top and adapted to receive and hold a nursing bottle, said inner hollow shell being cement sealed to the outer hollow shell at one end thereof with a space between the cylindrical walls of the two shells, and a top cap releasably fitting over the open tops of the two shells, said inner hollow shell having a bottle gripping means on the inner periphery thereof, said sealed, combined inner and outer shells having open bottom ends and a bottom end closure removably fitting over the open bottom ends of the combined shells, said bottom end closure having annular concentrically arranged nursing bottle supporting flanges various heights adapted to receive and hold the bottom end of a nursing bottle, and reinforced ribs between said annular flanges.

References Cited in the file of this patent

UNITED STATES PATENTS

| | | |
|---|---|---|
| 922,413 | Friedrich | May 18, 1909 |
| 978,892 | Janssen | Dec. 20, 1910 |
| 1,589,138 | Fisk | June 15, 1926 |
| 2,482,322 | Cortese | Sept. 20, 1949 |
| 2,500,786 | Austin | Mar. 14, 1950 |
| 2,715,326 | Gits | Aug. 16, 1955 |

FOREIGN PATENTS

| | | |
|---|---|---|
| 1,003,787 | France | Nov. 21, 1951 |